United States Patent [19]
Grube et al.

[11] Patent Number: 5,239,678
[45] Date of Patent: Aug. 24, 1993

[54] METHOD OF ASSIGNING A CONTROL CHANNEL AS A TEMPORARY VOICE/DATA CHANNEL IN A RADIO COMMUNICATIONS SYSTEM

[75] Inventors: Gary W. Grube, Palatine; Rafael J. Diaz, Hoffman Estates; Robert Adamczyk, Hawthorne Woods; Robin Roberts, Oak Park; Michael D. Sasuta, Mundelein, all of Ill.

[73] Assignee: Motorola, Inc., Schaumburg, Ill.

[21] Appl. No.: 795,588

[22] Filed: Nov. 21, 1991

[51] Int. Cl.⁵ .............................................. H04Q 9/00
[52] U.S. Cl. .................................. 455/34.1; 455/54.1
[58] Field of Search .................. 455/34.1, 34.2, 54.1, 455/54.2, 33.1, 53.1, 67.1, 56.1; 370/95.1, 95.3, 110.1

[56] References Cited

U.S. PATENT DOCUMENTS

| | | |
|---|---|---|
| Re. 32,789 | 11/1988 | Lynk, Jr. et al. |
| 4,434,506 | 2/1984 | Fujiwara et al. ............... 455/56.1 |
| 4,481,670 | 11/1984 | Freeburg. |
| 4,716,407 | 12/1987 | Borras et al. |
| 4,723,264 | 2/1988 | Sasuta et al. |
| 4,837,858 | 6/1989 | Ablay et al. |
| 4,942,570 | 7/1990 | Kotzin et al. ............... 370/110.1 |
| 5,054,109 | 10/1991 | Blackburn ..................... 455/54.2 |

OTHER PUBLICATIONS

Clearchannel LTR® Application Note, 1988, E. F. Johnson, Co.

Primary Examiner—Reinhard J. Eisenzopf
Assistant Examiner—Nguyen Vo
Attorney, Agent, or Firm—James A. Coffing; Joseph P. Krause; Steven G. Parmelee

[57] ABSTRACT

A method (215) of converting a current control channel for use as a communication (voice/data) channel, in order to maintain a predetermined level of service in a radio communications system, employs a central controller (101) to allocate a limited number of communication channels among a plurality of subscriber units (108-112). After receiving (203) a request for a communication channel from one of a plurality of subscriber units (108-112), the controller (101) determines (205) whether all of the communication channels are busy. The controller then temporarily converts (215) the current control channel to a communication channel.

12 Claims, 10 Drawing Sheets

METHOD OF ASSIGNING A CONTROL CHANNEL AS A TEMPORARY VOICE/DATA CHANNEL IN A RADIO COMMUNICATIONS SYSTEM

FIELD OF THE INVENTION

The present invention relates generally to wide area trunked radio communication systems, and more particularly to a method of increasing the efficiency of such systems by effective allocation of limited resources.

BACKGROUND OF THE INVENTION

Wide area trunked radio communication systems are well known. Such systems typically include remote, transmitter sites, e.g., repeaters, which serve a number of subscriber units, or radios, in the system. Subscriber units may be portable radios, mobile radios, consoles, or radiotelephones.

Typically, trunked radio system sizes range from two repeaters per site, to 20 repeaters per site. In a system having 20 repeaters, 19 of these repeaters may be dedicated voice/data (hereinafter "voice") channels while one repeater is a dedicated control channel which transmits/receives control signals to/from radios in the system. Some systems employ all available channels as voice channels; the control function for these systems is typically accomplished using either a hard-wired network connecting the repeaters, or with non-audible control signalling on some of the voice channels. In either case, the control traffic reduces the efficiency of a system, the primary purpose of which is to provide voice communications among its subscriber units.

As a first example of the problem, consider a small, low density system 100 (in FIG. 1A) having two voice channels (104, 106) and one control channel (102). When the number of users is relatively small (e.g., 100-300), two active voice channels are sufficient to maintain an acceptable level of service to the users. As the number of active subscriber units grows, however, the need may arise to add voice channel capability to the system. Adding another voice channel to such a small system will likely be a cost prohibitive solution to the problem. Because of this, users must live with the reduced system efficiency until they can afford to add another repeater for voice communications.

Figure 1A:
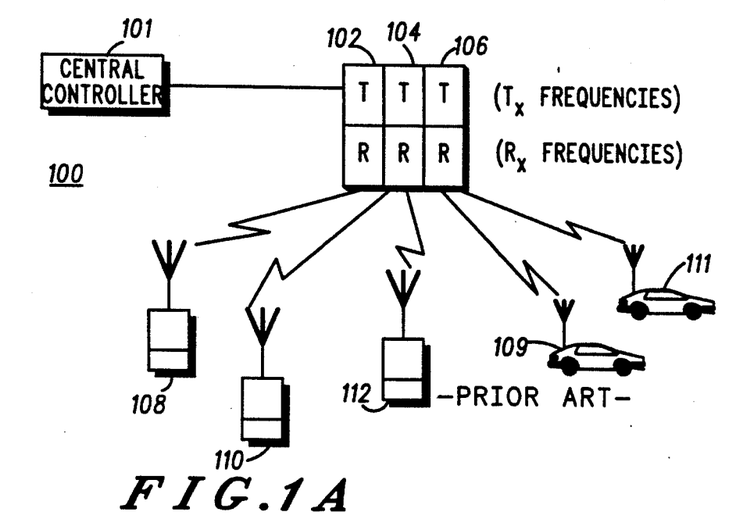
FIG. 1A is a simplified graphical representation of a low density trunked radio communication system which is known in the prior art.
Figure 1B:
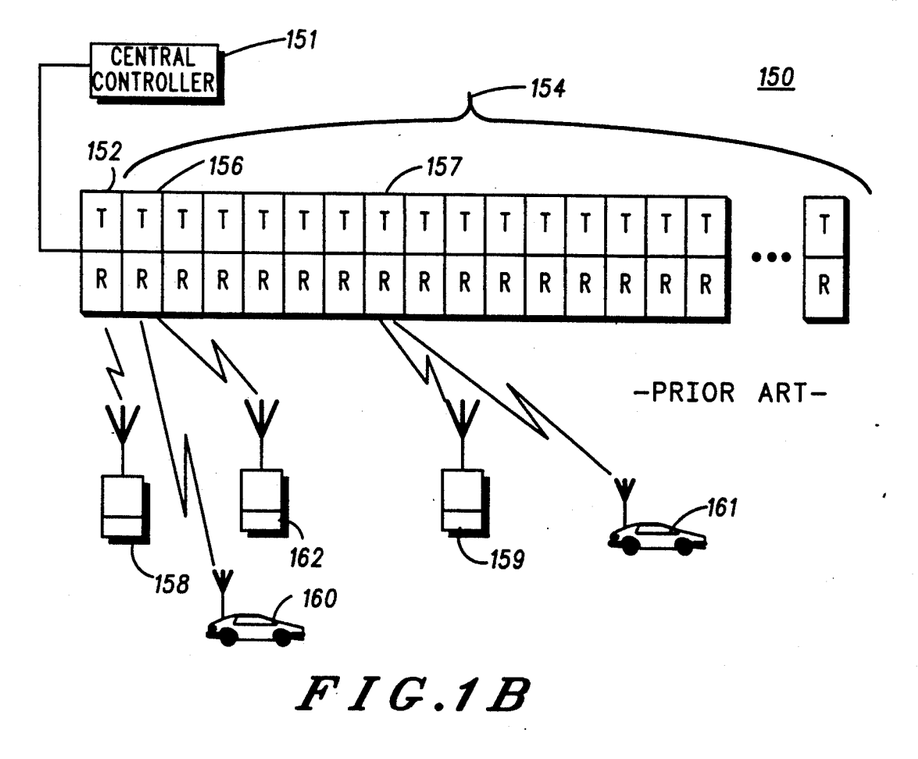
FIG. 1B is a simplified graphical representation of a high density trunked radio communication system which is known in the prior art.

As a second example, consider a large, high density system having many voice channels and one control channel, such as system 150 shown in FIG. 1B. When the number of users is relatively small for such a multi-channel system (e.g., 3000-5000), one control channel is sufficient to maintain an acceptable level of service to the users. As the number of active subscriber units grows, however, the need may arise to add control channel capability to the system. Adding another permanent control channel to serve a temporary increase in the number of users, like the small system example, represents a cost prohibitive solution to the problem. Therefore, users must live with the reduced system efficiency until the addition of a another dedicated control channel can be cost-justified.

Accordingly, there exists a need for a trunked radio system which provides temporary voice or control channel capability, as required, by using existing hardware. Such a system should allow dynamic allocation between control and communication resources, while providing an acceptable level of communication service to the subscriber units in the system.

SUMMARY OF THE INVENTION

The present invention encompasses a method of temporarily using a control channel to operate as a voice/data channel. After receiving a request for a communication channel from one of a plurality of subscriber units, the controller determines a current loading condition for the system. If all voice channels are busy, the controller then assigns, where appropriate, the current control channel as a voice channel.

DETAILED DESCRIPTION OF A PREFERRED EMBODIMENT

FIG. 1A shows a simplified, graphical representation of a small trunked radio communications system 100, whose configuration is well known. The repeater site shown includes a single control channel 102 and two voice channels 104, 106. Here, control channel 102 is used to control access to/from voice channels 104, 106. All three channels are directed by a central controller 101, e.g., Motorola part no. T5313 (so-called Startsite ™). Further, it should be noted that the preferred embodiment of the present invention will be described using a system which uses frequency modulation (FM) on radio frequency (RF) channels (i.e., frequency pairs), but similar communications could be, and often are, accommodated using other signalling techniques, e.g., time division multiplexing (TDM), frequency division multiplexing (FDM), etc.

Subscriber units 108–112, (hereafter "radios") may be portable radios, mobile radios, consoles, or radiotelephones, and are representative of all of the radios in the system 100 (these radios may be, for example, Motorola part nos. D27KGA5JC2AK (so-called Spectra ™) or D35MWA5GC6AK (so-called Maxtrac ™). Radios 109 and 111 might communicate via voice channel 106, while radios 110 and 112 might communicate via voice channel 104. Radio 108 is idle, under which condition it might monitor the control channel 102, waiting to engage in a communication. In such a small system, e.g., only two voice channels to allocate amongst less than 200 users, the control channel 102 is likely to be idle most of the time. The present invention seeks to take advantage of control channel idle time to provide additional voice communication capacity. This is accomplished by allowing the control channel to temporarily operate as a voice channel during periods of heavy voice traffic and minimal control traffic. One primary advantage of converting the control channel to a voice channel is that it obviates the need for purchasing additional hardware components (e.g., voice transceivers) to accommodate increased voice communication requirements for a particular coverage area.

Figure 2A:
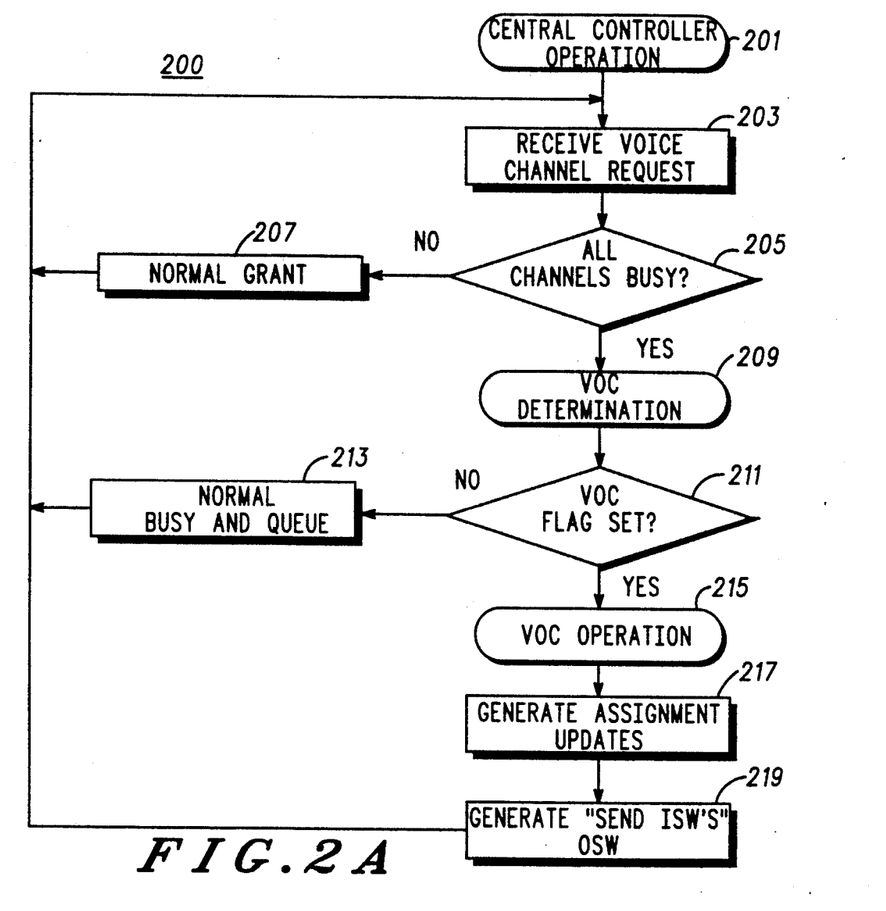
FIG. 2A is a simplified flow diagram depicting the central controller operation, in accordance with one embodiment of the present invention.

FIG. 2A shows a flow diagram 200 depicting the operation of the central controller 101, in accordance with one embodiment of the present invention. The central controller operation 201 begins when a voice channel request is received (203) from a radio. A decision is then reached (205) which determines whether or not all voice channels are currently busy. If all voice channels (e.g., 104,106) are not currently busy, i.e. there is at least one voice channel available, the central controller 101 issues (207) a normal channel grant outbound signalling word (OSW) over the current control channel 102, and continues to wait for channel requests. If all voice channels are found to be busy, the central controller 101 attempts to determine (209) whether or not the so-called "voice-on-control" (hereafter "VOC") mode should be entered. A decision is then reached (211) which determines whether or not the VOC flag, later described, has been set by the determination routine (209). If the VOC flag is not set, e.g., the central controller 101 has determined that entering the VOC mode would not be appropriate at this time, the central controller issues (213) a normal busy OSW on the control channel and returns to waiting for subsequent voice channel requests. If the VOC flag is set, the central controller enters (215) the VOC mode of operation. The aforementioned sequence represents the preferred embodiment of the invention, but it is appreciated that the VOC mode could be entered unconditionally when an additional voice channel is needed. The determination routine 209, later described, is used to ensure that the amount of time the system is without a control channel is minimal, such that the overall system performance remains relatively stable over time.

After completion of the VOC operation 215, which operation is later described, the central controller generates (217) the channel assignment updates for existing calls and busies (e.g., repeat OSW's representing the active calls and busies originating in blocks 207, 213; these repeats are for late joiners). The central controller 101 then generates (219) a "Send ISW's" OSW on the re-assigned control channel and returns to normal operation. Issuing the "Send ISW's" OSW advises all subscriber units in the system which have queued requests, to send them in on the re-assigned control channel.

Figure 2B:
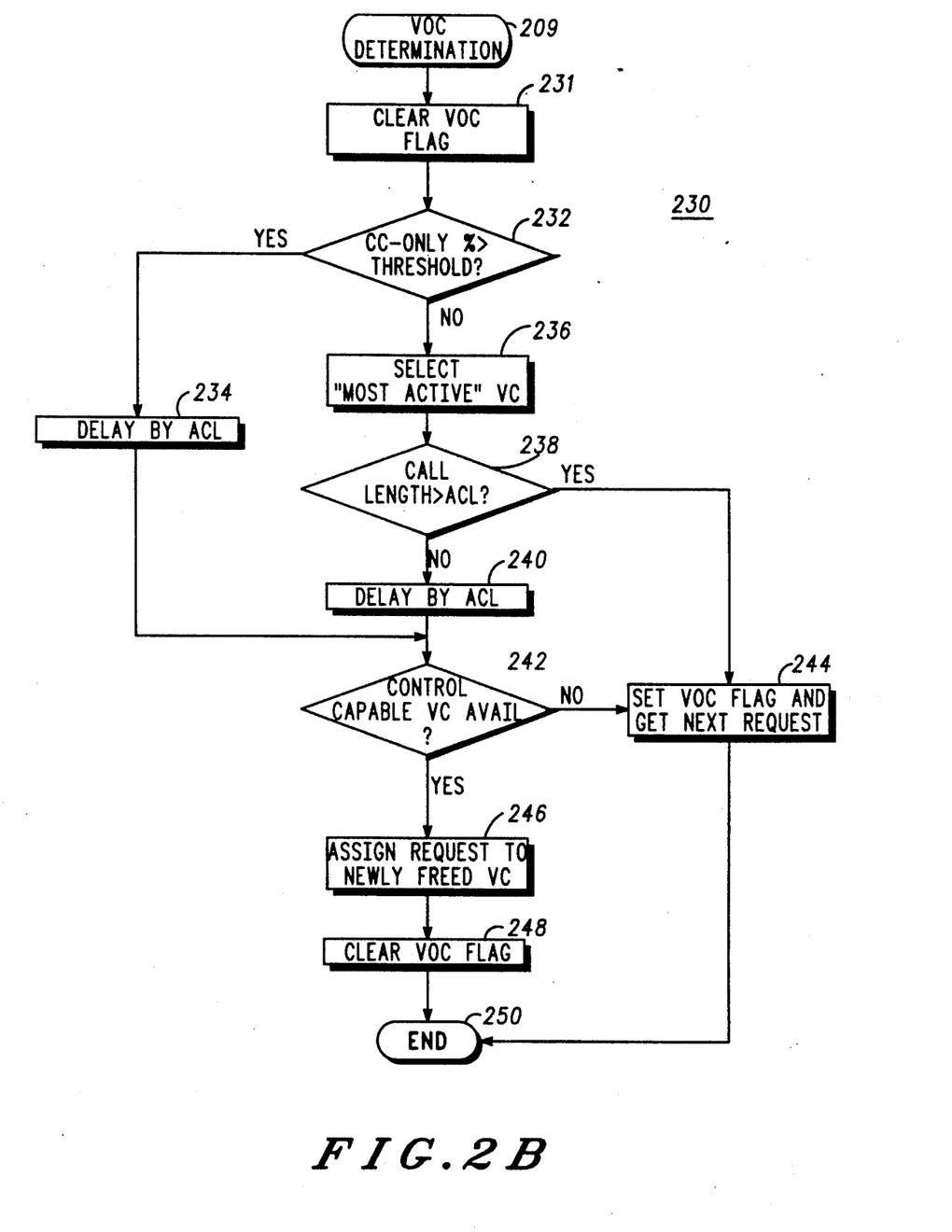
FIG. 2B is a more detailed flow diagram depicting the voice-on-control (VOC) determination routine of FIG. 2A, in accordance with one embodiment of the present invention.

FIG. 2B shows a detailed flow diagram 230 of the VOC determination routine 209. This routine is used to determine whether the current state of the system warrants the removal of the control channel. If it is determined that the system can withstand temporarily losing the control channel in order to accommodate a voice call, this routine seeks out the best candidate for placing that call. The routine begins by clearing (231) a VOC flag (which flag might simply be binary information residing in a RAM address of the central controller computer hardware) to initialize the routine in the default mode. The VOC flag's value will determine whether the VOC mode is 'on' or 'off', a binary 1 for 'on', and a binary 0 for 'off'. Next, the routine tests (232) whether or not the control channel-only traffic percentage is greater than a predetermined threshold percentage (i.e. percentage of the total number of transactions that have occurred on the control channel for a given time period). Typically, a high percentage of "CC-only" traffic is an indication that control channel transactions are more important than voice calls, and the control channel should not be removed. The threshold should be set at a level which, based upon historical performance, represents a maximum CC-only traffic percentage for maintaining an acceptable level of system performance. In the preferred embodiment, the threshold is set at approximately 63%, which percentage may vary depending on the system performance desired.

Returning to decision 232, if the CC-only transaction percentage is greater than the predetermined threshold, the control channel conversion is delayed (234). In the preferred embodiment, this delay is equal to the average call length (ACL), typically on the order of five-seven seconds (measurement of the ACL is well known in the trunking industry). Delaying the conversion by an amount equal to the current system ACL gives the system a reasonable chance of finding an available voice channel before converting the control channel. If the control channel-only percentage is not greater than the predetermined threshold, it then selects (236) the "most active" voice channel, i.e., the voice channel which has been supporting a call for the longest time. A decision is then reached (238) which determines whether or not the call length on the selected voice channel is greater than the current ACL for the system. If not, the control channel conversion is delayed (240) by a predetermined time, which in the preferred embodiment, is the present ACL for the system. Delaying the conversion by this amount anticipates that every current voice call is relatively new, and therefore, will not provide a new control channel candidate should the currently active control channel be converted to voice operations.

After the appropriate delay has transpired, the decision is then reached (242) which determines whether or not there is a voice channel available (i.e. freed up during the previously discussed delay period) to accept the voice call without having to take away the control channel. If a voice channel is available, the controller assigns (246) the voice channel request to the newly freed voice channel. The controller then clears (248) the VOC flag, before exiting the routine (250).

Returning now to decision 238, if the selected call length is greater than the average call length, the VOC flag is set (244) and the controller gets the next, highest priority, request before exiting the routine (250). Similarly, if there are no voice channels available (as determined by decision 242), the VOC flag is set (244) and the controller gets the next, highest priority, request before exiting the routine (250).

Figure 2C:
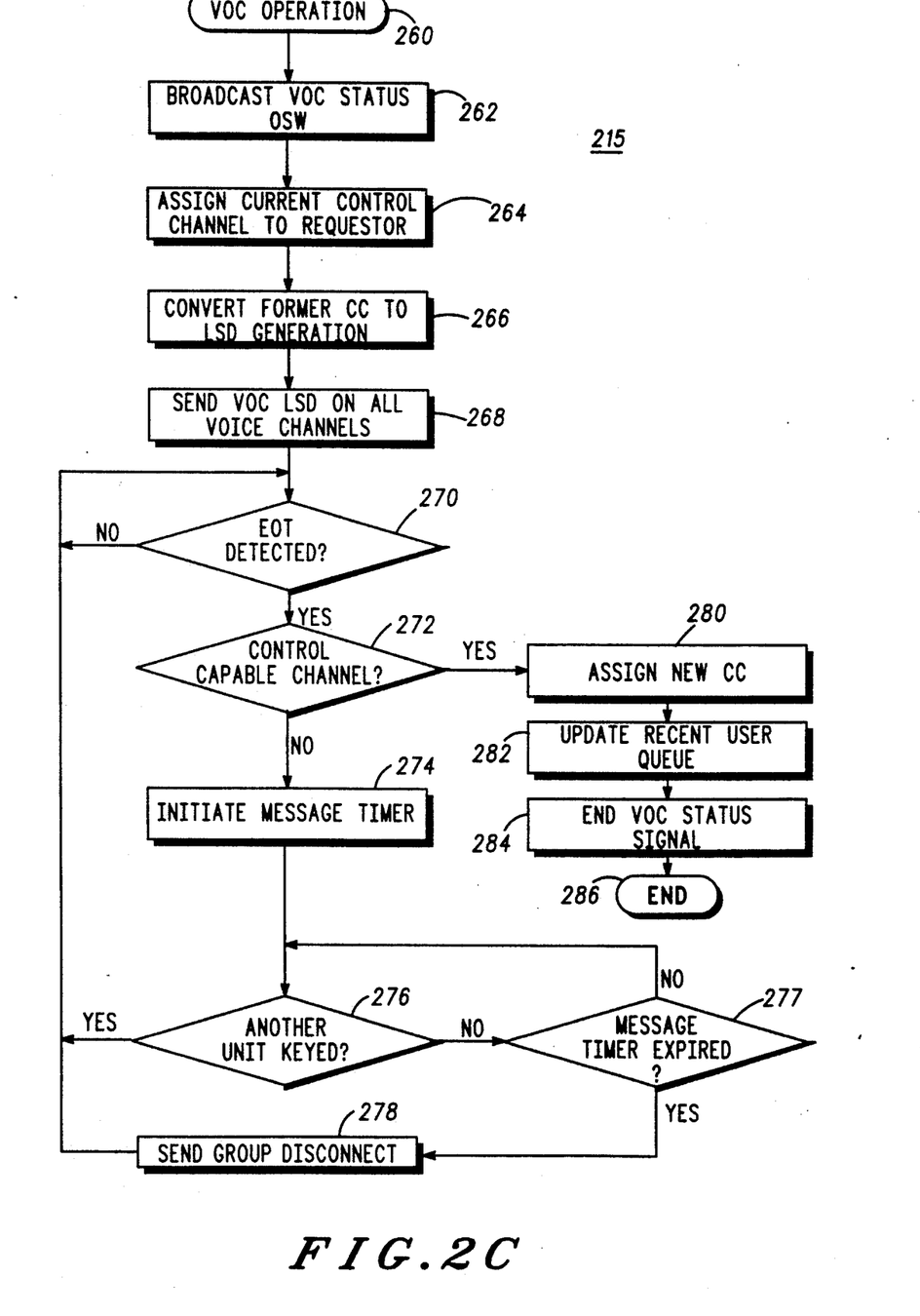
FIG. 2C is a more detailed flow diagram depicting the VOC operation routine of FIG. 2A, in accordance with one embodiment of the present invention.

FIG. 2C shows a detailed flow diagram 215 which depicts the VOC operation 260. Once it is decided that the VOC mode will be entered, the central controller broadcasts (262) the VOC status OSW (a special signal sent over the control channel to advise radios that the control channel is about to be taken away). The controller then assigns (264), via a standard channel grant OSW the current control channel (which may be any control-capable channel; i.e. a communication channel equipped with the necessary hardware/software to encode and decode control signalling) to the requesting radio for use as a temporary voice channel. The central controller converts (266) the former control channel to low speed data (LSD) generation to facilitate voice traffic, (e.g., sub-audible data rate of 150 bits/second). An LSD signal, indicating that the VOC mode has been activated, is then sent (268) on all voice channels.

At this point, the system 100 shown in FIG. 1A effectively has no control channel on which to allocate voice channels for subsequent voice traffic. Hence, it is desired to minimize the amount of time that the system is in this state, so that incoming requests can be accommodated. Accordingly, the central controller looks for its first opportunity to re-assign either the converted voice channel, or another control-capable voice channel, as a control channel. In order to do this, a decision is reached (270) which determines whether or not an end-of-transmission (EOT) has been detected on any of the voice channels (transmission-trunked operation is described in U.S. Pat. No. Re. 32,789 issued to Lynk, Jr. et al., Nov. 22, 1988, which is incorporated herein by reference). If an EOT has not yet been detected on any of the voice channels, the routine loops back and continues to monitor the voice channels, checking for this EOT condition. If an EOT has been detected, a decision is reached (272) which determines whether or not this particular voice channel is control-capable. If it is not control-capable, the controller initiates (274) a message, or fade, timer (which is also described with respect to message-trunked operations in U.S. Pat. No. Re. 32,789). In a preferred embodiment, use of a message timer ensures that the transmission is not of such a short duration that it causes problems, such as ending a call before another subscriber unit responds.

The routine then tests (276) to determine whether or not another radio has keyed up (i.e. initiated a transmission). If another radio is initiating a call, e.g., depressing the PTT button on his/her radio, the routine loops back to decision 270, looking for an EOT. If the system is idle with respect to new subscribers, e.g., no new radios have keyed up, a decision is reached (277) which determines whether or not the message timer has expired. If not, the routine loops back to decision 276, looking for another unit to key up. After the message timer has expired, the central controller 101 sends (278) a group disconnect (e.g., 300 bps pattern), ending the present call. The routine then returns to decision 270, checking for another EOT condition.

Referring again to decision 272, if it is determined that the newly freed voice channel is control-capable, the central controller assigns (280) it as a control channel. At this point, the central controller's so-called "recent user queue", which prioritizes the users according to when their calls were ended, is updated (282). In the preferred embodiment, this is to ensure that the user who most recently ended his call, via an EOT, is given highest priority to get the next available voice channel, if requested. An "End VOC" status signal (special signal advising radios that a control channel is being re-assigned) is then sent out on all voice channels (284), and the routine is exited (286).

Figure 3:
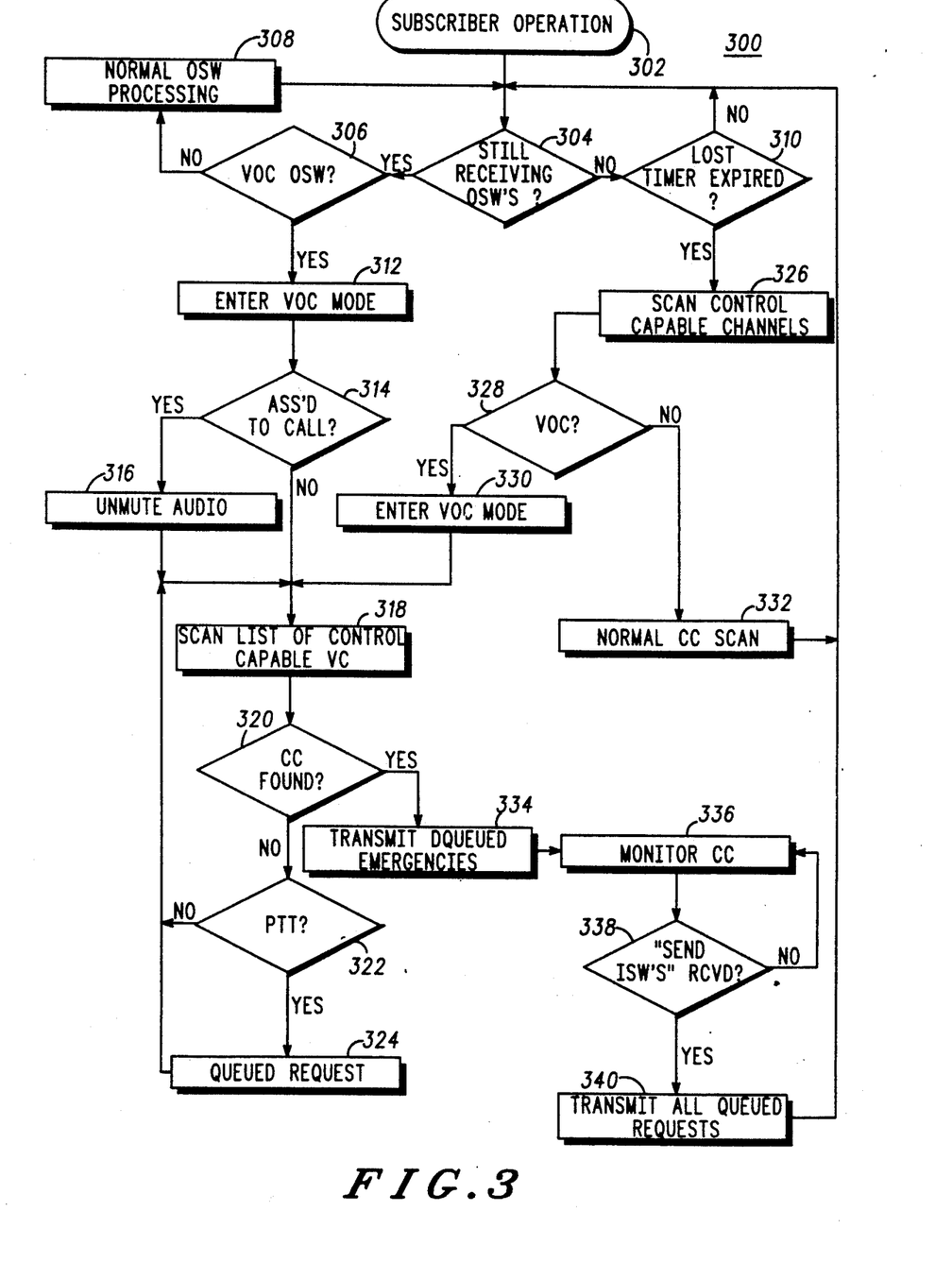
FIG. 3 is a simplified flow diagram depicting the subscriber unit operation, in accordance with one embodiment of the present invention.

FIG. 3 shows a simplified flow diagram 300 depicting the radio, or subscriber unit, operation 302, as in the preferred VOC-capable embodiment. The radio continuously monitors the current control channel (assigned by talkgroup ID) in order to remain in communication with the system 100. Accordingly, a decision is reached (304) which determines whether or not the subscriber unit is still receiving OSWs. If the unit is no longer receiving OSW's (i.e., an indication that it may be out of range or "lost"), a lost timer is then initiated. This delay (e.g., 200 ms in the preferred embodiment) is used to accommodate normal, momentary signal fading in a particular coverage area, such that the radio does not leave the control channel prematurely. A decision is then reached (310) to determine whether or not the lost timer has expired. If not, the routine loops back and continues to check for received OSWs on the current control channel. If the timer has expired, the radio scans (326) the control-capable voice channels (e.g., from a list of entries stored in the radio's memory), looking for control signals. A decision is then reached (328) to determine whether or not the VOC LSD signal has been detected on a voice channel being scanned (refer to FIG. 2C at 268). Having checked this, if the radio does not detect the VOC LSD, the subscriber scans (332) the normal control channel list, before returning back to normal operation. If the VOC LSD has been detected on the voice channel being scanned, the radio enters (330) into the VOC mode.

Returning back to decision 304, if the radio is still receiving OSWs, a decision is then reached (306) to determine whether or not the VOC status OSW has been received. If not, the radio processes (308) the OSW's in a normal fashion, and keeps looking for other OSW's. If a VOC status OSW has been received, the radio enters (312) into the VOC mode. At this point, a decision is reached (314) which determines whether or not the radio has been assigned to the call (i.e. the newly assigned control channel directs OSW grants to this unit, or its talk group). If so, the radio unmutes (316) the audio for normal voice channel signalling, and scans (318) the list of control capable voice channels. Similarly, if the assigned control channel does not target this unit or its talkgroup, the list of control-capable voice channels is scanned (318). At this point in the routine, the once-lost radio (i.e. who joined by detecting (328) the VOC LSD signal) also scans (318) the list of control-capable voice channels.

While scanning, a decision is reached (320) to determine whether or not a control-capable channel has been found. If not, a decision is reached (322) to determine whether or not the push-to-talk (PTT) button on the radio has been pressed. If PTT has not been engaged, the radio returns to the scanning operation (318). If PTT has been pressed, the ISW request is queued (324) in the radio's internal buffer (e.g., RAM), after which time the subscriber unit returns to the scanning operation 318. In the preferred embodiment of the invention, the queued requests are ranked, or prioritized, so that emergency requests are given a higher priority than normal voice communication requests.

Once a control channel has been re-assigned, i.e., a control-capable channel is found at decision 320, the radio transmits (334) queued emergency, or other predetermined priority type, requests. This allows high priority requests the first opportunity to obtain earlier-requested resources, without having to be explicitly advised to send them in. At this point, the radio monitors (336) the newly assigned control channel, looking for the "Send ISW's" OSW (a special signal for advising the radios that the VOC mode has ended and queued requests are to be sent in over the control channel). A decision is then reached (338) to determine whether or not the "Send ISW's" has been received. If not, the radio continues to monitor (336) the current control channel, checking for an indication that the VOC mode is inactive. If the "Send ISW's" OSW is received, the radio transmits (340 all remaining queued requests (e.g., non-emergency requests yet to be sent) from its internal buffer, before returning to normal operation.

Figure 4:
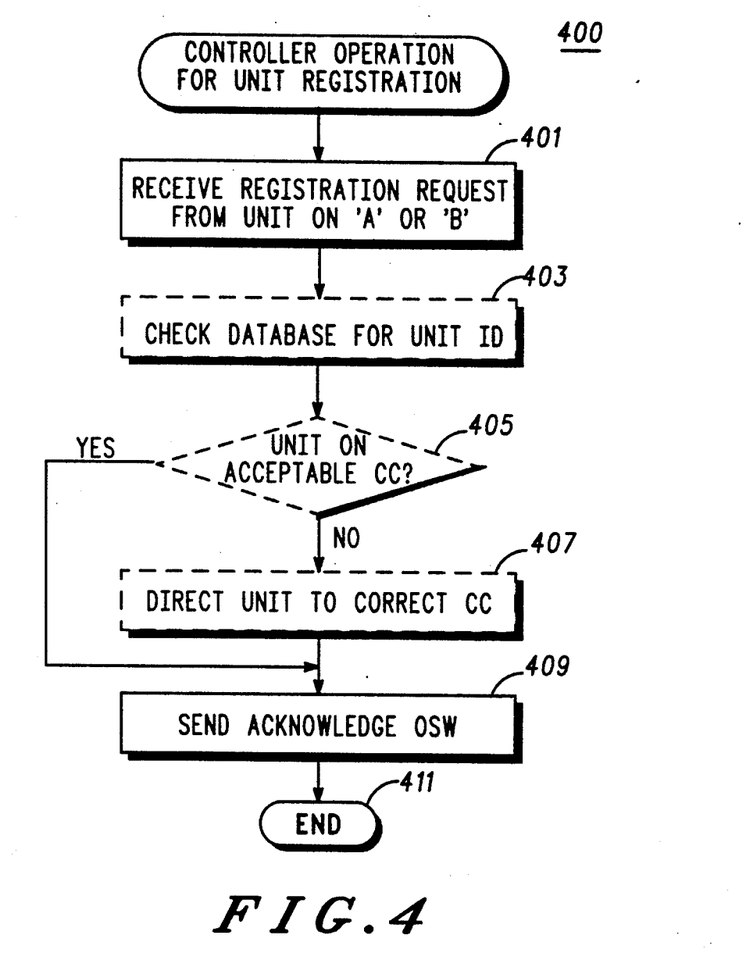
FIG. 4 is a simplified flow diagram depicting the central controller operation, in accordance with an alternate embodiment of the present invention.

FIG. 4 shows a simplified flow diagram 400, depicting the central controller operation during subscriber unit, or radio, registration. The routine begins when the central controller receives a registration request (401) on one of the active control channels, e.g., control channel "A", or "B". It should be noted that in one embodiment of the present invention the central controller utilizes a database for tracking the particular control channel being used by each of the subscribers in the system. In an alternate embodiment, there might not be any database tracking and all of the signalling is done redundantly on all of the active control channels. Accordingly, upon receipt of a registration request, the central controller retrieves (403) the control channel information for the radio having that unit ID, from a portion of the database, if applicable, for that radio. If the registration request came in on an acceptable control channel (i.e., either the only active control channel or the same control channel as the one retrieved from the database), the controller sends an acknowledge OSW (409), and the registration process is complete (411). In the case where there is a database in the central controller, and the request came in on a control channel other than that which was retrieved (in 403), then the central controller directs (407) the unit to the correct control channel. An acknowledge OSW is then sent (409) and the registration for that unit is complete.

Figure 5A:
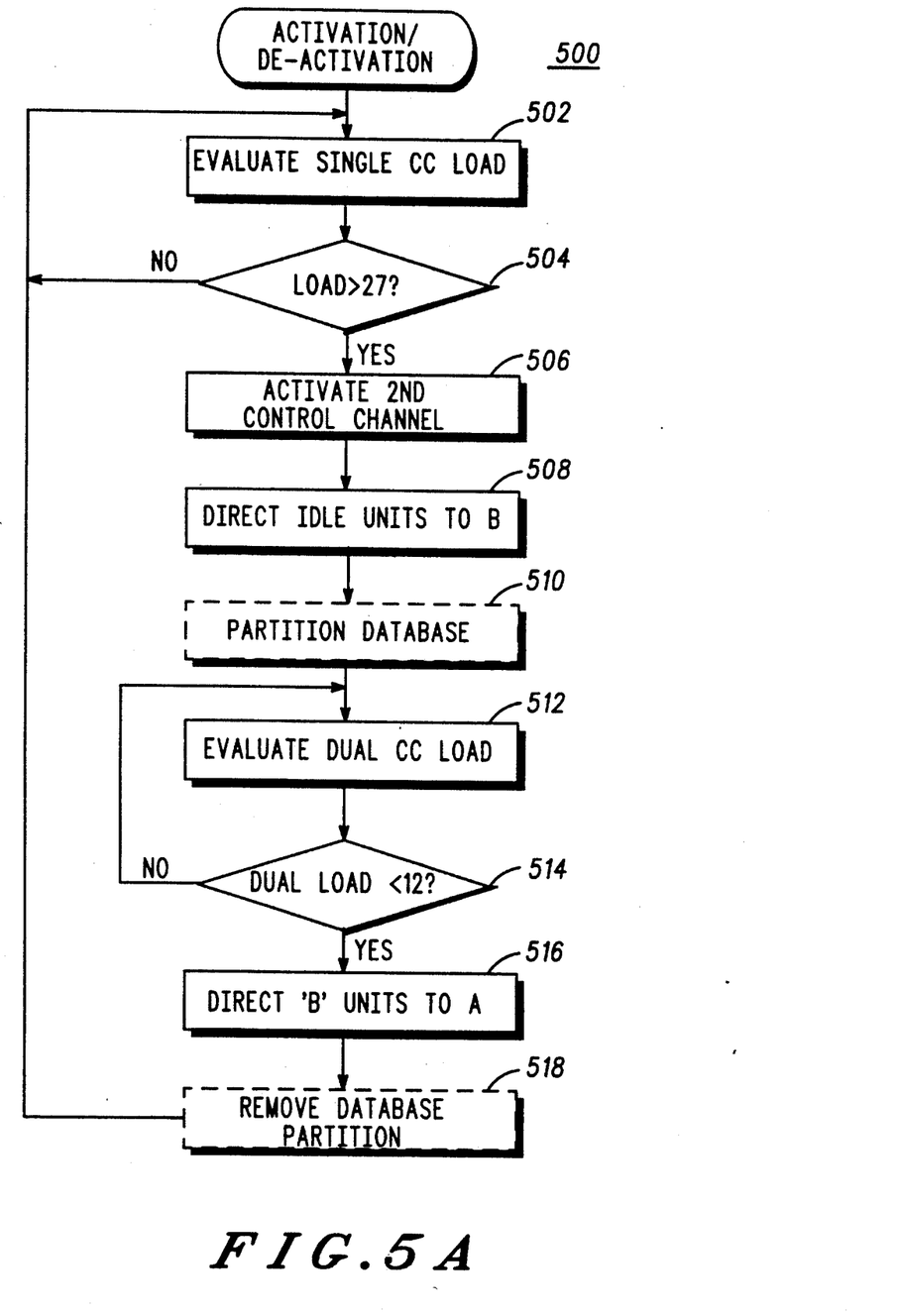
FIG. 5A is a simplified flow diagram depicting the algorithm used for activation/de-activation of a multiple control channel configuration, in accordance with one embodiment of the present invention.
Figure 5B:
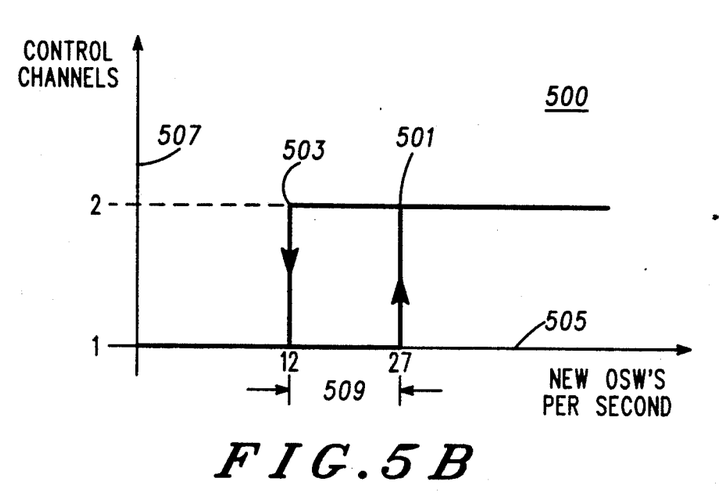
FIG. 5B is a graphical representation showing the relationship between control channel traffic and number of control channels required to handle such an amount of traffic, in accordance with one embodiment of the present invention.

FIG. 5A shows a simplified flow diagram 500 depicting the activation/deactivation process which determines when there are more than one control channel active on the system. Beginning with only a single control channel, the central controller evaluates the load condition of the particular active control channel 502. In the preferred embodiment of the present invention, control channel traffic loading is measured by a parameter referred to as "new OSWs per second" (NOPS). This parameter is well understood in the art, and is generally a good indicator of control channel loading at any point in time. (FIG. 5B shows a graphical representation of how, in a preferred embodiment, the decision is made to go from one control channel to two, and vice versa. The abscissa 505 shows the number of new OSW per second, while the ordinate 507 shows the number of control channels active on the system. As shown in the graph 501, once the NOPS rate reaches the upper loading threshold, e.g., 27, the control channel is advised of the requirement to increase the number of control channels. Once operating with two control channels, the algorithm determines when it is feasible to go back to using a single control channel, i.e. at the lower loading threshold. In a preferred embodiment, this occurs at point 503, when the number of NOPS decreases to 12. Reference number 509 indicates the rate separation which, in the preferred embodiment, is designed to insure that the system will not toggle between one and two control channels during certain times of operation. The so-called "hysteresis" effect can be varied (i.e., increasing or decreasing the rate separation 509) to optimize the system performance.)

Returning to FIG. 5A, if the single control channel load is greater than 27 NOPS (504), there is no need to increase to two control channels and the routine continues to evaluate (502) the loading traffic. If, on the other hand, the load is greater than 27, the central controller activates a second control channel (506). Having done so, the controller directs (508) any idle units to the second control channel, e.g., control channel B. For those systems that have a database, the database is then partitioned (510) to indicate which units and groups of units are on which control channels. The controller then evaluates (512) the dual control channel voting traffic, i.e., using an average NOPS as a criterion. The system retains the use of the second control channel until the loading traffic goes below 12 N.O.P.S. (514), after which time the units using the B channel are directed (516) to the A channel. This direction is typically accomplished using standard OSW signalling. Lastly, in the case where the central controller has a database, the database partitioning is removed (518) and all the units in the system are indicated as using the same dedicated control channel.

Figure 6:
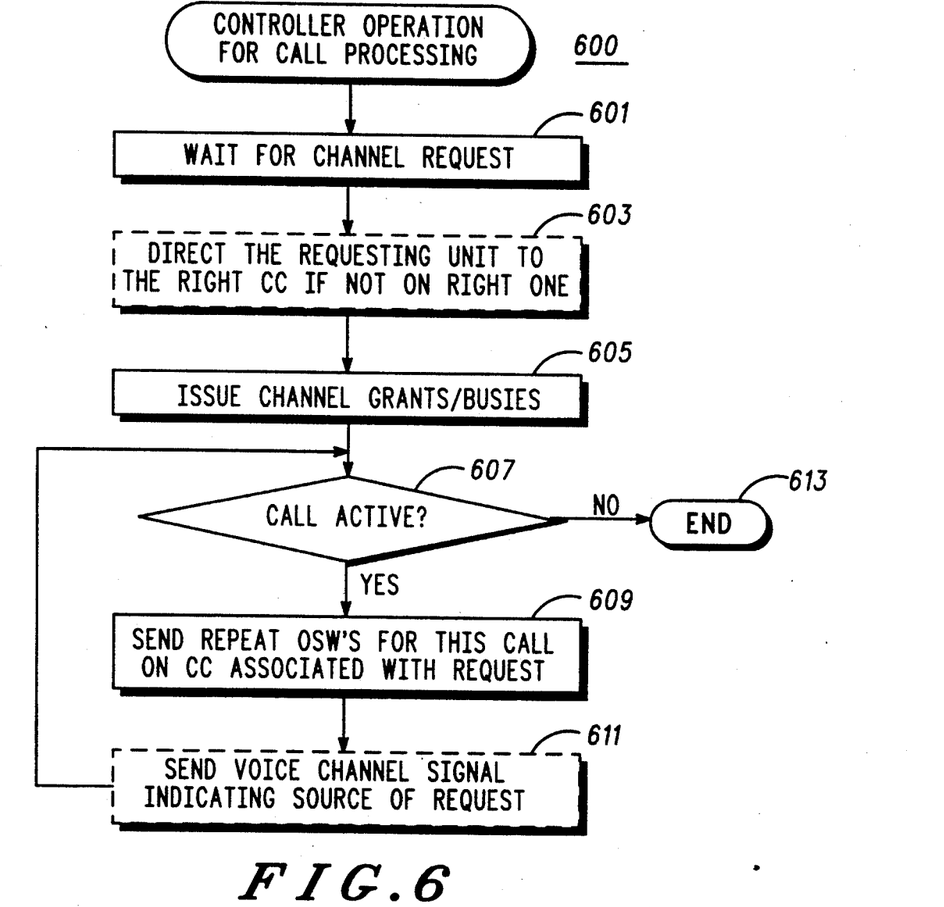
FIG. 6 is a simplified flow diagram depicting the controller operation for call processing, in accordance with one embodiment of the present invention.

The call processing operation for the central controller is outlined in FIG. 6 using the simplified flow diagram 600. After waiting (601) and receiving a channel request, the central controller issues (605) either a channel grant or a channel busy OSW. In the controller without the database embodiment, this OSW is sent on the control channel in which the request came in on. For those systems which employ a database in the central controller, prior to issuing the response OSW (605) the central controller directs (603) the requesting radio to the right control channel if not already on the assigned control channel. After the subscriber engages in the call, the central controller determines whether or not the call is still active (607). This may be done using well known EOT signalling, after receipt of which the routine is ended (613). During the call, the central controller repeatedly sends (609) OSWs for this call on the control channel associated with the request. These repeat OSWs are used to gather late joiners, and other radios which may have temporally lost communication with the control channel. In the system which does not have a database, the central controller then sends (611) voice channel signals indicating the source of the call request (i.e., which control channel issued the request). This non-audible signalling is used to keep the talk group units together on the same control channel without having to store independently the control channel for each unit.

Figure 7:
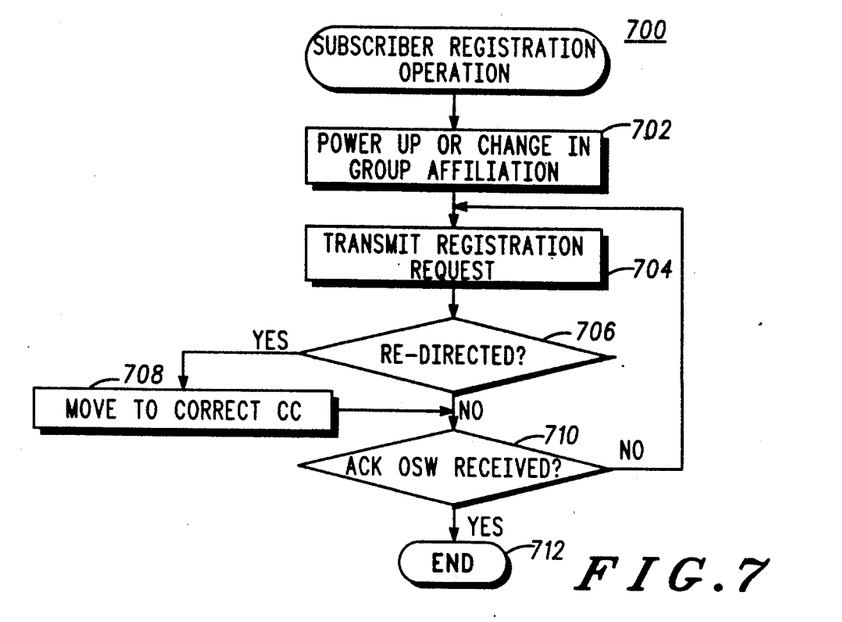
FIG. 7 is a simplified flow diagram depicting the subscriber registration operation, in accordance with one embodiment of the present invention.

FIG. 7 shows a simplified flow diagram 700 of the subscriber registration operation. Upon power up (702) or change in group affiliation, the subscriber (radio)

transmits (704) a registration request ISW. If the radio is redirected (706) the radio moves to the correct control channel frequency (708). If not redirected to a new control channel, or after moving to the correct control channel, the radio waits for an acknowledgement OSW it has received (710). Once received, the subscriber registration routine is complete (712). If the acknowledge OSW is not received, the radio simply re-transmits a registration request (704), and attempts to register again.

Figure 8A:
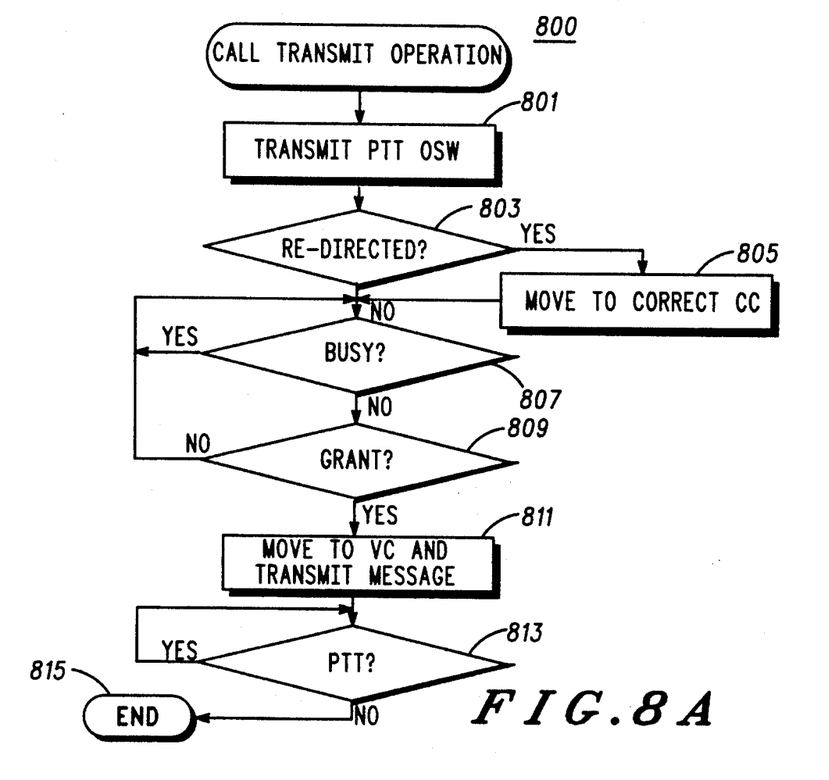
FIG. 8A is a simplified flow diagram depicting the subscriber call transmit operation, in accordance with one embodiment of the present invention.

FIG. 8A shows a simplified flow diagram 800 of the call transmit operation for the subscriber radio. After transmission of the PTT OSW (801), the radio checks to see if it has been redirected (803). If so, the radio moves (805) to the correct control channel. If not redirected or after moving to the correct control channel, the radio looks for either a busy or a grant OSW. If the radio receives a busy OSW (807), it continues to monitor the control channel looking for a channel grant. Similarly, if a grant is not received (809) the radio continues to monitor looking for either a busy or a grant. In the preferred embodiment, the radio will look for either a busy OSW or a grant OSW for 4 seconds, which is considered adequate if the system is operating properly. After a 4 second timer expires, the radio aborts the transmission effort and is aborted. Once a channel grant is received, the radio moves (811) to the granted voice channel and transmits its message. The message is then continually transmitted until the push-to-talk button is released (813), which signifies the completion of the call transmission (815).

Figure 8B:
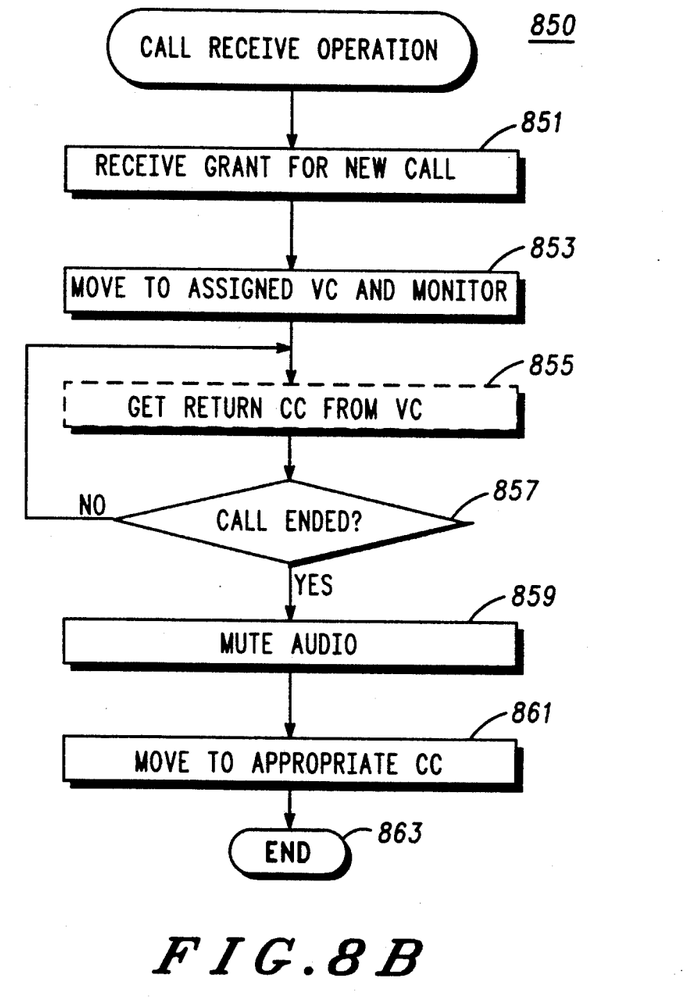
FIG. 8B is a simplified flow diagram depicting the subscriber call receive operation, in accordance with one embodiment of the present invention.

FIG. 8B shows a simplified flow diagram 850 of the call receive operation in the radio. Upon receipt (851) of a grant for a new call, the radio moves to the assigned voice channel (853) and monitors that channel. In the alternative embodiment (no controller database), the radio then receives (855) the control channel ID to return to after receiving the call non-audibly from the voice channel. This insures that a redirected radio from the talk group takes with it all of the other radios in its talk group after being redirected. The call continues (857) until and EOT is received, after which the audio circuitry is muted (859). The radio then moves to the appropriate control channel (861) in accordance with the non-audibly received (855) ID (for non-database systems), or the request-origin control channel (for database systems), before the receive operation is completed (863).

What is claimed is:

1. In a central controller used in a radio communications system having a limited number of voice channels, the central controller allocating the voice channels via a control channel on which control signals are sent, a method of converting a current control channel for use as a voice/data channel in order to maintain a predetermined level of communication service to a plurality of radios in the system, the method comprising the steps of:
   receiving, from a requesting one of the plurality of radios, a request for a voice channel;
   determining whether all of the voice channels are busy;
   determining when it is determined that all of the voice channels are busy, a current loading condition for the current control channel; and
   assigning, responsive to said step of determining, the current control channel as a temporary voice channel.

2. A method in accordance with claim 1, wherein said step of assigning further comprises the step of broadcasting a voice-on-control (VOC) status signal on said current control channel.

3. A method in accordance with claim 1, wherein said step of assigning further comprises the step of sending, on at least one of the voice channels, a VOC ongoing status signal.

4. A method in accordance with claim 1, further comprising the step of re-assigning a new control channel.

5. A method in accordance with claim 4, further comprising the step of sending, on said new control channel, an indication signal to send inbound signalling words (ISW's) on said new control channel.

6. A method in accordance with claim 1, further comprising the step of comparing said current loading condition with a loading threshold, the loading threshold representing a maximum level of communication traffic for which communication service can be maintained at least to the predetermined level without using said current control channel.

7. A method in accordance with claim 6, further comprising the step of delaying, when said current loading condition exceeds said loading threshold, said step of assigning by a predetermined amount of time.

8. In a radio used in a radio communications system having a limited number of voice channels, the system further having a dynamic control channel configuration, the radio receiving outbound signalling words (OSW's) from a central controller, and sending inbound signalling words (ISW's) to the central controller, the OSW's and ISW's being used for facilitating access to the limited number of voice channels, a method of accommodating a change in control channel configuration, the method comprising the steps of:
   receiving a first indication signal that a current control channel is being assigned as a voice channel;
   queuing, responsive to said first indication signal, subsequent request ISW's; and
   sending, at a later time, said queued ISW's to the central controller, via a control channel that is made available at said later time.

9. A method of accommodating a change in control channel configuration in accordance with claim 8, wherein said step of queuing further comprises the step of prioritizing said subsequent request ISW's.

10. A method of accommodating a change in control channel configuration in accordance with claim 8, further comprising the step of receiving a second indication signal that a new control channel has been re-assigned.

11. A method of accommodating a change in control channel configuration in accordance with claim 10, wherein said step of sending further comprises the step of transmitting, responsive to said second indication signal, said queued request ISW's via said new control channel.

12. A method of accommodating a change in control channel configuration in accordance with claim 9, further comprising the step of selectively sending a particular class of said prioritized request ISW's to the central controller.

* * * * *